United States Patent [19]

Duimelaar

[11] 3,766,337

[45] Oct. 16, 1973

[54] TRANSMISSION SYSTEM FOR THE TRANSMISSION OF SIGNALS BETWEEN TWO TERMINAL STATIONS THROUGH A TRANSMISSION LINE INCLUDING REPEATER STATIONS

[75] Inventor: Jasper Hendrik Duimelaar, Hilversum, Netherlands

[73] Assignee: U. S. Philips Corporation, New York, N.Y.

[22] Filed: May 5, 1972

[21] Appl. No.: 250,681

[30] Foreign Application Priority Data

Dec. 7, 1971 Netherlands ........................ 7105347

[52] U.S. Cl. ......................................... 179/175.31 R
[51] Int. Cl. ............................................. H04b 3/46
[58] Field of Search ................. 179/175.31 R, 175.3

[56] References Cited

UNITED STATES PATENTS

| | | | |
|---|---|---|---|
| 3,560,670 | 2/1971 | Heyes | 179/175.31 R |
| 3,557,323 | 1/1971 | Chalhoub | 179/175.31 R |
| 3,617,657 | 11/1971 | Brewer | 179/175.31 R |
| 3,450,847 | 6/1969 | Barnes | 179/175.31 R |

*Primary Examiner*—William C. Cooper
*Assistant Examiner*—Douglas W. Olms
*Attorney*—Frank R. Trifari

[57] ABSTRACT

The invention relates to a transmission system for information signals sent between two terminal stations of a carrier telephone system having repeater stations. Each repeater station is provided with a line amplifier which is bridged for direct current supply by a direct current supply bypass circuit. A measuring oscillator circuit connected to the input of the line repeater for checking the connections between the two terminal stations and is activated and deactivated by an oscillator switching device which is controlled through the transmission line from one of the terminal stations by means of a control circuit incorporated therein. This control circuit comprises a control oscillator circuit having an adjustable amplitude control connected thereto for generating control signals for individual control of the oscillator switching devices. The control signals are characterized by their frequency and their amplitude; the frequency being located below the transmission band. These control signals are transmitted through the direct current supply bypass circuits to the oscillator switching devices while bypassing the line amplifiers. These switching devices are furthermore provided with a cascade arrangement of a frequency selective circuit and an amplitude measuring device for activating the relevant measuring oscillator circuit if the amplitude of the control signal applied through the selective circuit to the amplitude measuring device corresponds to the amplitude adjustment of the amplitude measuring device.

10 Claims, 6 Drawing Figures

TRANSMISSION SYSTEM FOR THE TRANSMISSION OF SIGNALS BETWEEN TWO TERMINAL STATIONS THROUGH A TRANSMISSION LINE INCLUDING REPEATER STATIONS

The invention relates to a transmission system for the transmission of information signals in a prescribed frequency band between two terminal stations through a transmission line including repeater stations in which the line amplifier incorporated in each repeater station is shunted for direct current supply by a direct supply current bypass circuit conveying the direct supply current and being connected through separating filters to the transmission line, said direct supply current and said information signals being transmitted through the transmission line, said repeater stations each being provided with a cascade arrangement of a measuring oscillator circuit and an oscillator start-stop circuit and being connected to the input of the line amplifier, said start-stop circuit being controlled through the transmission line without using a separate control lead by a control device incorporated in a terminal station, while the measuring signal originating from the measuring oscillator circuit is indicated by an indicator incorporated in said terminal station.

Such measuring oscillator circuits are used *inter alia* for localizing a defective repeater station, namely by measuring the frequency, with the aid of the indicator, of the measuring signal transmitted after it is released in the measuring oscillator circuit and passes through the terminal station.

In a known transmission system of this kind in which the oscillator start-stop devices are controlled by reducing the level of the direct supply current with the aid of the control device all measuring oscillator circuits are simultaneously released for the transmission of a measuring signal which is characteristic of each of the repeater stations, which measuring signals are distinguished from one another by their frequency. The measuring oscillator circuits are provided with a measuring generator which in tuned to a frequency characteristic of the relevant repeater station.

The above described transmission system has been satisfactory in practice but practical difficulties were found to occur in the transmission of signals in very broad frequency bands, for example, in the frequency band of from 4 to 60 MHz as is nowadays proposed for carrier telephony systems. To satisfy the very stringent quality requirements of carrier telephony transmission in such a broad frequency band, the mutual distance between the repeater stations is to be reduced to a considerable extent, for example, in the broad-band carrier telephony system described the mutual distance of the repeater stations is only 1.5 kms so that in such a transmission system dozens of repeater stations are to be used for bridging the conventional transmission distances of, for example, 60 kms.

In such a broad-band transmission system a large number of measuring generators of different tuning frequencies is required for fault localization, while in addition very stringent frequency stability requirements are to be imposed on these measuring generators in order that their tuning frequency is maintained under highly varying operating conditions, particularly in cases of temperature fluctuations. In addition the repeater stations are often manufactured as compact units so that a large number of different types of repeater stations is obtained.

An object of the invention is to provide a different conception of a transmission system of the kind described in the preamble in which the number of different repeater stations is reduced to a minimum while using the properties of the transmission lines, while also less stringent requirements need be imposed on the frequency stability of the measuring generators.

To this end the invention is characterized in that the control device is constituted by a driver oscillator circuit having an adjustable amplitude control connected thereto for generating control signals characterized by their frequency and amplitude for controlling the oscillator start-stop devices in the different repeater stations, which control signals having a control frequency located below said frequency band are transmitted through the transmission line and through the direct current supply by-pass circuit to the oscillator start-stop devices in the different repeater stations while bypassing the line amplifiers said oscillator start-stop devices being provided with a cascade circuit of a selective circuit and an amplitude measuring device and activating each relevant measuring oscillator circuit connected thereto only when the amplitude of the control signal applied through the selective circuit to the amplitude measuring device corresponds to the amplitude adjustment of the amplitude measuring device.

In order that the invention may be readily carried into effect some embodiments thereof will now be described in detail by way of example with reference to the accompanying diagrammatic drawings in which:

FIG. 1 shows a principle circuit diagram of the transmission system, while

FIG. 5 shows a modification of the transmission system according to FIG. 1 while

Figure 1:
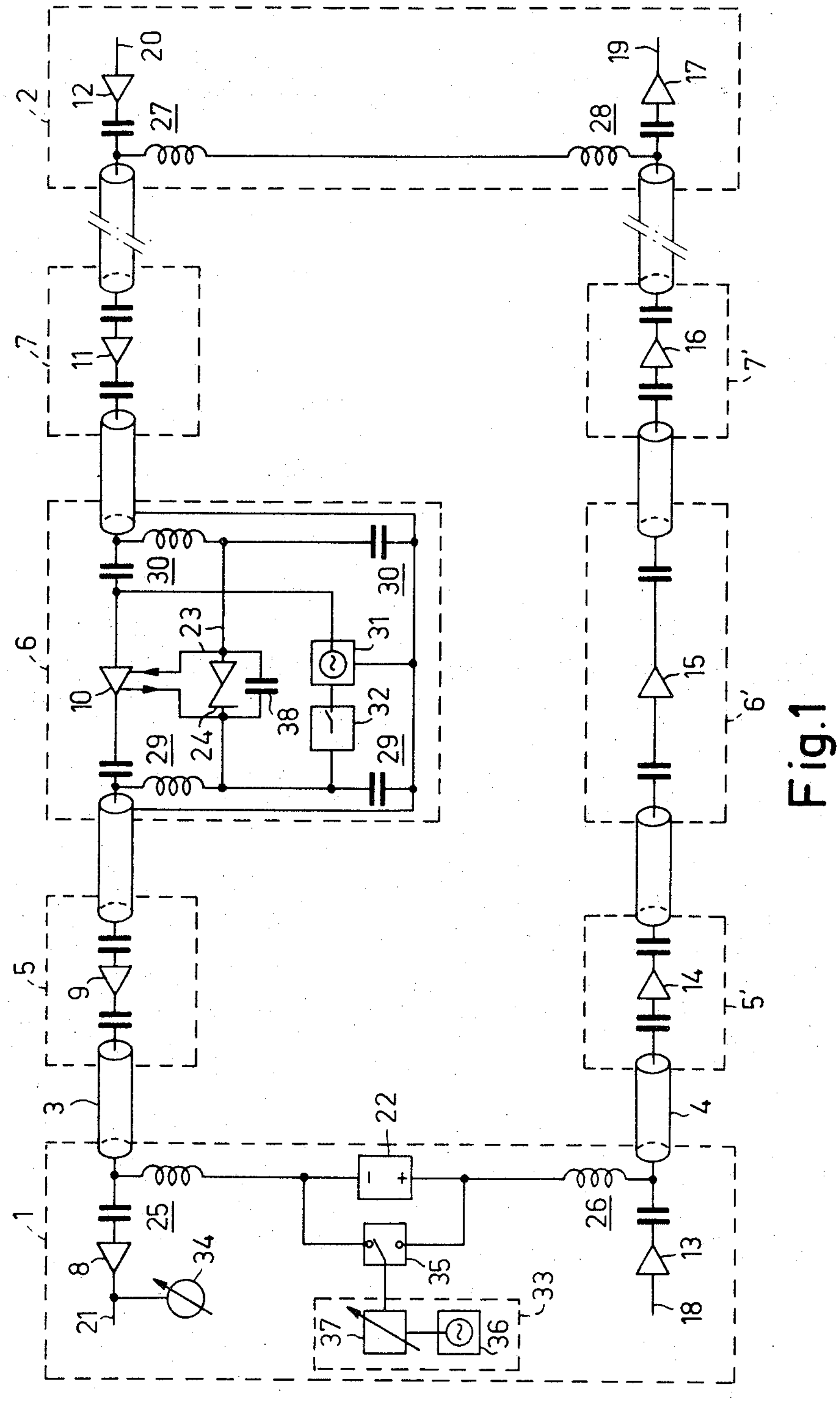

FIG. 1 shows a transmission system for the transmission of information signals in a frequency band of from 4 to 60 MHz between a west terminal station 1 and an east terminal station 2 through an east-west transmission line 3 and a west-east transmission line 4 including repeater stations 5, 6, 7 and 5', 6', 7', respectively. For the sake of simplicity only three repeater stations are shown in each transmission line, but this number is in practice much larger, for example, 40. The stations 1, 5, 6, 7, 2 are each provided with east-west line amplifiers 8 – 12 while the stations 1, 2 as well as the stations 5', 6' and 7' are also provided with west-east line amplifiers 13 – 17 for amplification of the carrier telephony signals transmitted in the western and eastern directions, respectively. Thus the carrier telephony signals originating from a line 18 in terminal station 1 are transmitted through the line amplifiers 13 – 17 and the transmission line 4, for example, a coaxial cable to a line 19 in terminal station 2, while conversely the carrier telephony signals originating from a line 20 in terminal station 2 are transmitted through the line amplifiers 12 – 8 and the transmission line 3 to a line 21 in terminal station 1. The repeater stations 5, 5′, 6, 6′, 7, 7′, are unmanned stations, whereas the terminal stations 1 and 2 which also include the carrier modulator and demodulator equipment are permanently or temporarily manned.

To feed the line amplifiers 8 – 17 terminal station 1 includes a direct supply current source 22 which is connected to the two inner conductors of the coaxial transmission lines 3 and 4, which inner conductors are connected together for forming a supply direct current circuit in the terminal station 2 which also functions as a supply loop station, while furthermore each line amplifier is bridged for direct current supply by a direct current supply bypass circuit conveying this direct supply current, which circuit is denoted by 23 in the repeater station 6. This bypass circuit is connected to the inner conductor of the transmission line 3 and is in turn shunted by a Zener diode 24 which normally does not convey current for protecting the line amplifier 10 from large values of longitudinal currents and for keeping the supply circuit intact when the direct current circuit of the amplifier circuit is interrupted. To separate the carrier telephony signals and the direct supply current, terminal stations 1 and 2 include separation filters 25, 26 and 27, 28, respectively, and the repeater stations include separating filters 29 and 30 as is shown for the repeater station 6.

To guard the connection between the two terminal stations particularly for localizing a defective line amplifier, a cascade circuit of a measuring oscillator circuit 31 and an oscillator start-stop device 32 is connected to the amplifier input of each line amplifier, which device is controlled through the transmission line, that is to say, without using a separate control lead, by a control circuit 33 incorporated in the terminal station 1, while the measuring signal originating from the measuring oscillator circuit 31 is indicated by an indicator 34 incorporated in said terminal station 1.

In the embodiment shown the control device 33 is to be connected through a switch 35 to the transmission line 3 and the measuring oscillator circuit 31 is activated by this control lead through the oscillator start-stop device 32 so that a measuring signal of a given frequency is transmitted through the line amplifier 10 and the transmission line 3 to the terminal station 1 where the reception of this measuring signal is confirmed by means of the indicator 34, for example, by "measuring" the frequency of the measuring signal. In the absence of an expected measuring signal a defective line amplifier is thus localized.

In order to be able to impose less stringent requirements on the frequency stability of the measuring generators in such a transmission system employing a large number of repeater stations, for example, 40 and in order to reduce the number of repeater stations which are mutually different as regards the measuring frequency to a minimum, the control device 33 according to the invention is constituted by a control oscillator circuit 36 and an adjustable amplitude control 37 connected thereto for generating control signals characterized by their frequency and amplitude for individual control of the oscillator start-stop devices in the different repeater stations. Each control signal has a control frequency located below the said frequency band and is transmitted through the transmission line and through the direct current supply bypass circuits which to this end are also bridged by a capacitor 38 to the oscillator start-stop devices 32 in the different repeater stations while bypassing the line amplifiers, said oscillator start-stop devices being provided with a cascade circuit of a selective circuit and an amplitude measuring device and activating each relevant measuring oscillator circuit connected thereto if the frequency and the amplitude of the transmitted control signal correspond to the tuning of the selective circuit and to the amplitude adjustment of the amplitude measuring device.

Figure 2:
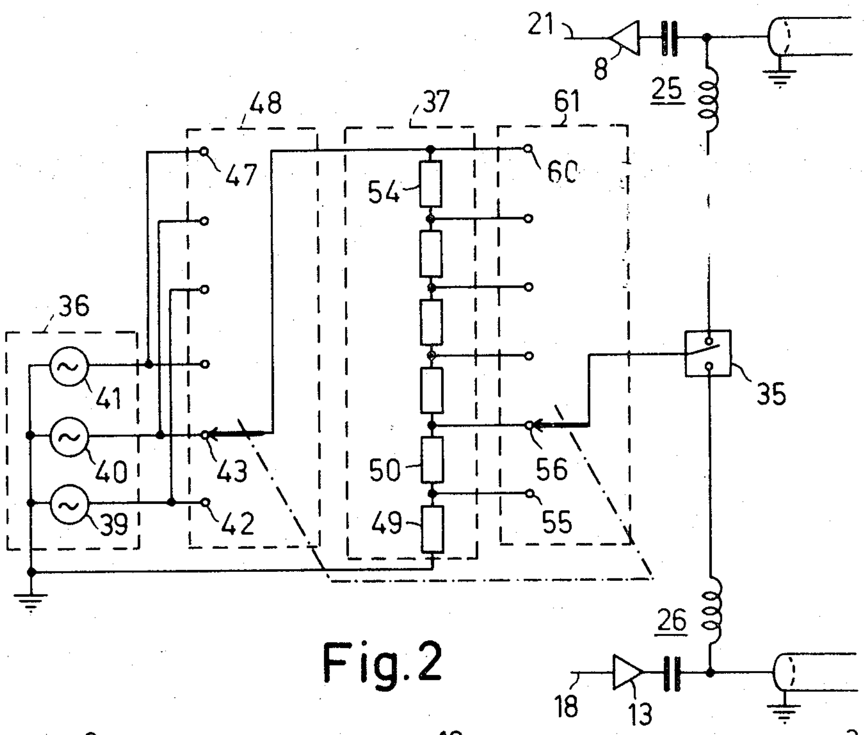
FIG. 2 shows a further elaboration of the control device.

In the embodiment shown said selective circuits of three successive repeater stations 5, 6, 7 are tuned to mutually unequal frequencies, namely to the frequencies $f_1$, $f_2$, and $f_3$ and, as is shown in greater detail in FIG. 2, the control oscillator circuit 36 is provided with three control generators 39, 40 and 41 likewise tuned to the frequencies $f_1$, $f_2$ and $f_3$, respectively. These control generators are separately connected to a plurality of contacts 42 – 47 of a switch 48 and may optionally be connected to the input circuit of the amplitude control 37. This amplitude control is constituted by a variable attenuation network consisting of a cascade arrangement of a plurality of attenuation networks 49 – 54 connected in parallel with the input circuit of the amplitude control, which attenuation networks are also provided between contacts 55 – 60 of a switch 61. Thus a control signal is obtained at the output of switch 61 having a frequency and an amplitude determined by the position of switches 48 and 61.

In this embodiment the two switches 48 and 61 are provided with six contacts each, but in practice this number, at least as regards switch 62, is at least equal to the number of repeater stations incorporated in one of the transmission lines.

Figure 3:
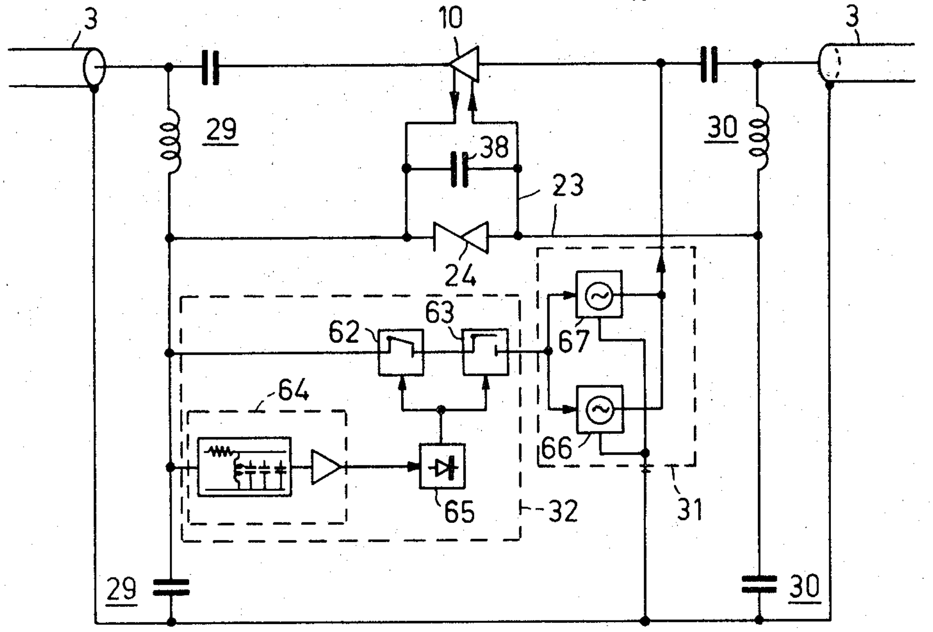
FIG. 3 shows a further embodiment of a repeater station

As is shown in FIG. 3 in greater detail the oscillator start-stop device 32 is constituted by a cascade arrangement of a first and a second switch 62 and 63 connected to the direct current supply bypass circuit 23, which switches are controlled by the output signal from the cascade arrangement of the selective circuit in the form of a selective amplifier 64 and the amplitude measuring device 65 and which cascade arrangement of switches is also connected to the direct current supply circuit of the measuring oscillator circuit 31 composed of two measuring generators 66 and 67.

The measuring generators 66 and 67 are tuned to a frequency located below and above the frequency band of from 4 to 60 MHz, for example, to 3.8 and 63 MHz, respectively. As a result it is achieved on the one hand that the information signals are not influenced by these measuring signals and on the other hand the line amplifier properties in case of fault localization are controlled both for the low and for the high part of the frequency band.

In the transmission system shown the measuring oscillators located in the different repeater stations are separately activated for the purpose of fault localization with the aid of the control signals generated in the terminal station 1 by the control device 33, which signals are adjustable both in frequency, namely at the frequencies $f_1$, $f_2$ and $f_3$ located below the frequency band and are adjustable in amplitude. The transmission of the control signals is not only effected through the transmission line but is also effected, in contrast with the transmission of the information signals, through the direct current supply bypass circuit 23 while bypassing the line amplifiers and particularly through the separating filters 29, 30 and the capacitors 38 included in parallel with the Zener diode 24 in the direct current supply bypass circuits 23. Thus the amplitude of the transmitted control signal will gradually decrease as a result of the properties of the transmission line, particularly as a result of the cable attenuation, and of the direct current bypass circuits, while exclusively the measuring oscillator circuit of the repeater station is activated by the oscillator start-stop device for which there applies that the frequency tuning and the amplitude adjustment of the selective circuit and amplitude measuring device incorporated in the oscillator start-stop device correspond to the frequency and the amplitude, respectively, of the control signal applied to the oscillator start-stop device and being reduced in amplitude by the cable attenuation. The measuring signals from the measuring oscillator circuit activated in this manner and applied to the input of the relevant line amplifier and, after amplification by the relevant line amplifiers and possibly succeeding line amplifiers, they are applied to the indicator 34 incorporated in the terminal station 1.

On the one hand the measuring oscillator circuits connected to the inputs of the different line amplifiers may all be formed in the same manner because these measuring oscillator circuits are separately activated while on the other hand the amplitude adjustments of the amplitude measuring devices are equal for all oscillator start-stop devices. For activating a given measuring oscillator circuit the amplitude of the required control signal is adjusted in such a manner by the amplitude control 37 that after attenuation of the control signal by the part of the transmission line located between the terminal station 1 and the relevant repeater station the amplitude of the control signal is equal to the amplitude adjustment of the amplitude measuring device included in the relevant repeater station. When more in detail the amplitude adjustment of the amplitude measuring devices in all repeater stations is $p$ dBm measured in absolute level and when the attenuation of the control signal over a transmission distance equal to the distance between two succeeding repeater stations is equal to $a$ dB, the amplitude of $q$ dBm of the relevant control signal in terminal station 1 likewise measured in absolute level is to satisfy the relation: $9 = p + n{\cdot}a$ for the purpose of checking the line amplifier having the rank number $n$. Thus, with the condition that the amplitude adjustment of the amplitude measuring devices is mutually equal in all repeater stations, the successive adjustments of the amplitude control correspond to the attenuations of the control signals through the transmission line to the successive repeater stations.

Not only does the use of the steps according to the invention yield a considerable uniform embodiment of the repeater stations, but it is also found that by applying the control signals in the frequency band of from 2 – 35 kHz reliable and little critical fault localization can be realized which under all circumstances satisfies the very stringent requirements for carrier telephony transmission.

In the relevant transmission system in which the frequencies $f_1$, $f_2$ and $f_3$ of the control signals in the frequency band of from 2 to 35 kHz are particularly chosen to be 27, 30 and 33 kHz, respectively, a temperature variation of the cable is found to have no disturbing influence on the amplitude of the control signals, while in addition the attenuation differences introduced by frequency-dependent attenuation only play a very slight role in spite of the relatively large frequency distance between the control signals, for example, a distance of approximately 10 percent. As a result it is achieved on the one hand that with amplitude measuring devices present in the repeater stations and being mutually equal in construction and adjustment the amplitude control 37 may be built up from a cascade arrangement of mutually equal attenuation networks 49 – 54 and the two switches 48 and 61 of FIG. 2 can be coupled in such a manner that whenever there is a change-over to another attenuation value of the stepwise adjustable amplitude control there is also a change-over to another frequency, while the attenuation value of each of the attenuation networks 49 – 54 corresponds to the magnitude of the cable attenuation between two successive line repeaters.

On the other hand the relatively large mutual frequency distance of the control signals yields a simple and little critical embodiment of the selective circuits in the oscillator start-stop devices.

In spite of the small attenuation of the control signals occurring in the frequency band of from 2 to 35 kHz, for example, the attenuation between two successive line amplifiers is approximately 1 dB, a little critical amplitude adjustment of the amplitude measuring devices is still obtained; by using a plurality of control signals which are unequal in frequency, the mutual distance between the repeater stations which are controlled by the control signals of the same frequency is artificially enlarged. Particularly in this embodiment in which three control frequencies are used, the attenuation between two successive repeater stations which are controlled by a control signal of the same frequency is three times larger than the attenuation between two directly succeeding line amplifiers and is, for example, 3 dB. As a result a margin of 3 dB is obtained for adjusting the amplitude of each control signal. On the other hand the very small attenuation of the transmission path for the control signals has the advantage that for controlling the different repeater stations it is sufficient to have low-power control signals.

Using the properties of the transmission line, a reliable and little critical fault localization is realized with a considerable uniformity of the repeater stations, which properties make it even possible to form the repeater stations during their manufacture as mutually equal units. Particularly the selective circuits are provided with three tuning capacitors (see FIG. 3) one of which is connected, during installation of the repeater stations, to the selective circuit with the aid of an interconnection, for example, in the form of a dipole plug for tuning the selective circuit to one of the frequencies $f_1$, $f_2$, $f_3$.

Together with the advantages realized the transmission system described in which the control signals are transmitted while bypassing the line amplifiers is found to be very flexible in use; the control signals can be transmitted against the transmission direction of the information signals so that it is achieved that a defective line amplifier is immediately localized after the relevant control signal is transmitted.

Figure 4:
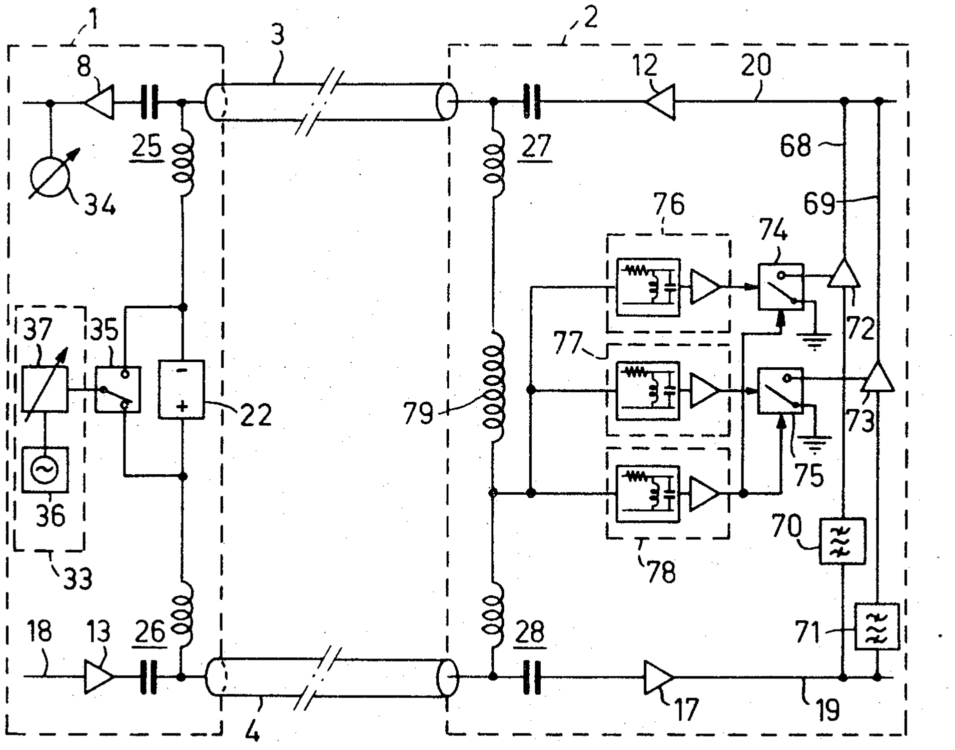
FIG. 4 shows an embodiment of a terminal station provided with a bypass loop for the measuring signals suitable for fault localization in the transmission device

Also when, for example, the terminal station 2 is unmanned a defective line amplifier may still be localized from the terminal station 1 in the transmission line 4 by applying the measuring signals of 3.8 and 63 MHz originating from these repeater stations through the terminal station 2 and the transmission line 3 to the indicator 34 in the terminal station 1 in the manner as is illustrated in FIG. 4. To this end the terminal station 2 is provided with two bypass loops 68 and 69 including selection filters 70, 71, respectively connected to the transmission line 4 and repeaters 72, 73, respectively. The selection filters 70 and 71 are tuned to the frequencies of 3.8 and 63 MHz, respectively, of the measuring signals while each of the supply current circuits of the amplifiers 72, 73 is provided with switches 74 and 75, respectively, for switching these repeaters on and off. For the purpose of closing, these switches are controlled by the output signal from selective amplifiers 76, 77 and for opening they are controlled by the output signal from a selective amplifier 78 which amplifiers are to this end connected to the separating filter 28 while the supply loop includes a stop-band filter 79 for the control signals.

To check the line amplifiers in the transmission line 4 from terminal station 1, the amplifiers 72 and 73 are both switched on or optionally one of them is switched on from said terminal station. To this end two of the three control signals which are unequal in frequency, for example, the control signals of 27 and 30 kHz having a higher level, for example, 6 dB higher than is required for the last repeater station are transmitted via the transmission line 4 which control signals close switches 74 and 75 through the selective amplifiers 76 and 77 tuned to the frequencies of 27 and 30 kHz, respectively, so that the two transmission lines 3 and 3 are connected together for the measuring signals through the amplifiers 72 and 73. To switch off the two amplifiers 72 and 73, for example, the control signal of 33 kHz is used which is likewise transmitted at a higher level through the transmission line 4 and which opens the two switches 74 and 75 through the selective amplifier 78 tuned to this frequency of 33 kHz so that the feedback loop is again interrupted.

It is to be noted that the control device 33 may not only be formed with three separate oscillators but with a single generator which is adjustable in frequency, for example, by selectively switching on a parallel circuit of a plurality of capacitors incorporated in its resonant circuit.

Figure 5:
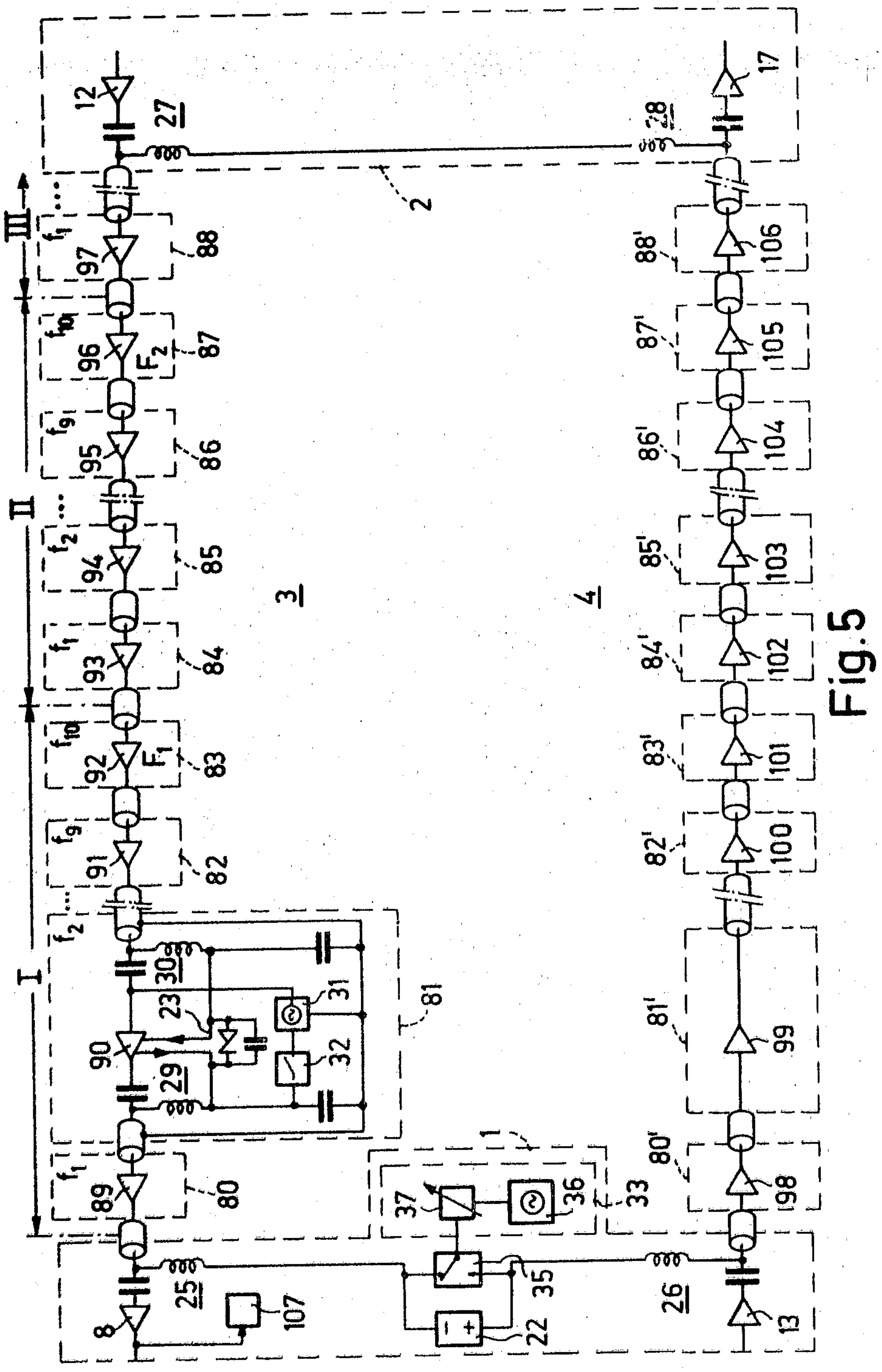

FIG. 5 shows a modification of the transmission system according to FIG. 1 which is particularly suitable for use in very long transmission lines of, for example, 120 kms comprising, for example, 80 repeater stations. For such long transmission lines stringent discrimination requirements are to be imposed on the selective circuits in the oscillator start-stop devices 32. In fact, a control signal of the frequency $f_1$ required for testing a line amplifier located at a large distance from the terminal station 1 is not to genetate a signal having a level responsive to the associated amplitude measuring device at the output of a selective circuit tuned to a control frequency $f_2$ and being associated with a line amplifier located at a shorter distance from the terminal station 1.

Also for such long transmission lines steps are to be taken in order to avoid influences on the fault localization by a temperature fluctuation of the cable and an attendent variation of the cable attenuation.

In order to localize a defective line amplifier in a very long transmission line in a simple manner the repeater stations 80 – 88 and 80' – 88' located between two terminal stations 1 and 2 are arranged in successive repeater groups, each repeater group being constituted by a plurality of successive repeater stations whose associated measuring oscillator circuits 31 are tuned to mutually unequal frequencies, while the control device 33 in the terminal station 1 provides an amplitude-adjustable control signal of fixed frequency $f_o$.

In FIG. 5 only three repeater groups are indicated which are denoted by I, II and III, respectively. The repeater groups I and II are each formed, for example, by ten repeater stations only four of which are indicated per group, namely the repeater stations 80 – 83 and 84 – 87, while only the repeater station 88 is shown for the repeater group III in this embodiment. The tuning frequencies of the measuring oscillators of the repeater stations associated with one group are represented by $f_1, f_2, \ldots, f_9, f_{10}$ as is shown in the FIG. 5. As already stated hereinbefore each of these frequencies is located below or above the frequency band of from 4 to 60 MHz, but each frequency may alternatively be formed by two composite frequencies, for example, frequency $f_1$ represents a frequency $f_{11}$ located below the frequency band of 4 to 60 MHz and a frequency $f_{12}$ located above this frequency band.

As a result of the attenuation of the cable and the direct current supply bypass circuits the amplitude of the control signal whose frequency is, for example, 3.5 kHz will gradually decrease. Particularly this decrease between two successive repeater stations is, for example, 0.8 dB. In spite of the small attenuation occurring at this frequency of the control signal, a little critical amplitude adjustment of the amplitude measuring device is obtained. In fact, by using a plurality of measuring signals which are unequal in frequency the mutual distance between the repeater stations which transmit measuring signals of the same frequency is artificially enlarged. Particularly in this embodiment in which ten measuring frequencies are used the mutual distance and hence the attenuation between two successive repeater stations which transmit measuring signals of the same frequency is ten times larger than the attenuation between two directly succeeding repeater stations and is approximately 8 dB. At such a large margin between the switch-on and switch-off levels a large distance may be maintained between the levels at which the oscillator start-stop device will certainly switch on and switch off the oscillator circuit. Without special steps this distance may be reduced to 4 dB so that a margin of another 4dB remains so as to compensate for possible tolerances in, for example, the repeater distances. Thus it is achieved that two measuring oscillator circuits tuned to the same frequency are not activated simultaneously. For example, in the embodiment shown the level of the control signal for switching off the measuring oscillator circuit of the repeater station 80 is approximately 4 dB below the level of the control signal for switching on the measuring oscillator circuit of repeater station 84 tuned to the same frequency.

Not only do the steps according to the invention prevent simultaneous transmission of measuring signals of the same frequency originating from different repeater stations, but also of measuring signals of different frequencies and originating from widely spaced repeater stations. In fact, by using control signals which are equal in frequency also all selective circuits in the oscillator start-stop devices are tuned to the same frequency so that the output signal of such a selective circuit is independent of the magnitude of the attenuation in its cut-off region. Once a measuring oscillator circuit is switched off by means of a control signal having a given amplitude, it is not again switched on by a control signal having a larger amplitude.

Due to the great level difference between the switch-off level of a measuring oscillator circuit and the switch-on level of the directly succeeding measuring oscillator circuit tuned to the same frequency, an attenuation variation as a result of temperature fluctuation of the cable neither has any influence on a correct fault localization. Particularly this attenuation variation is approximately 2 dB for a 120-km cable so that a measuring oscillator circuit is permanently switched off when the subsequent measuring oscillator circuit tuned to the same frequency is switched on.

In addition a quick indication of the group within which a defective line repeater is present can be obtained with this transmission system. To this end, for example, exclusively those measuring oscillator circuits which are tuned to the frequency $f_{10}$ are activated from the terminal station 1 by a successive increase of the amplitude of the control signal. When an expected measuring signal is then not received, this means that there is a defective line amplifier between this repeater station and the terminal station from which the control signal is transmitted.

In a further embodiment of the transmission system according to the invention a measuring oscillator circuit of one of the repeater stations within each repeater group is tuned to a tuning frequency characterizing the relevant repeater group and distinguishing the repeater groups mutually. In the embodiment shown the measuring oscillator circuits of the repeater stations 83 and 87 are tuned for this purpose to frequencies $F_1$ and $F_2$, respectively, which thus distinguish the given repeater groups I and II. By using this step a simple indicator is realized while maintaining the advantages already mentioned, which indicator will be further described hereinafter.

It is to be noted that on the one hand as a result of the great difference between the switch-on and switch-off levels of the oscillator start-stop device and on the other hand the slight attenuation of the control signal upon transmission between two successive repeater stations a control signal of given amplitude, for example, of four successive repeater stations activates the measuring oscillator circuits, namely of those repeater stations for which there applies that the amplitude level of the control signal is located between the switch-on and switch-off levels of the oscillator start-stop device. In this case, however, the simultaneously operating measuring oscillators are mutually distinguished by their frequency, which simultaneously transmitted measuring frequencies are indicated by the indicator 107.

Figure 6:
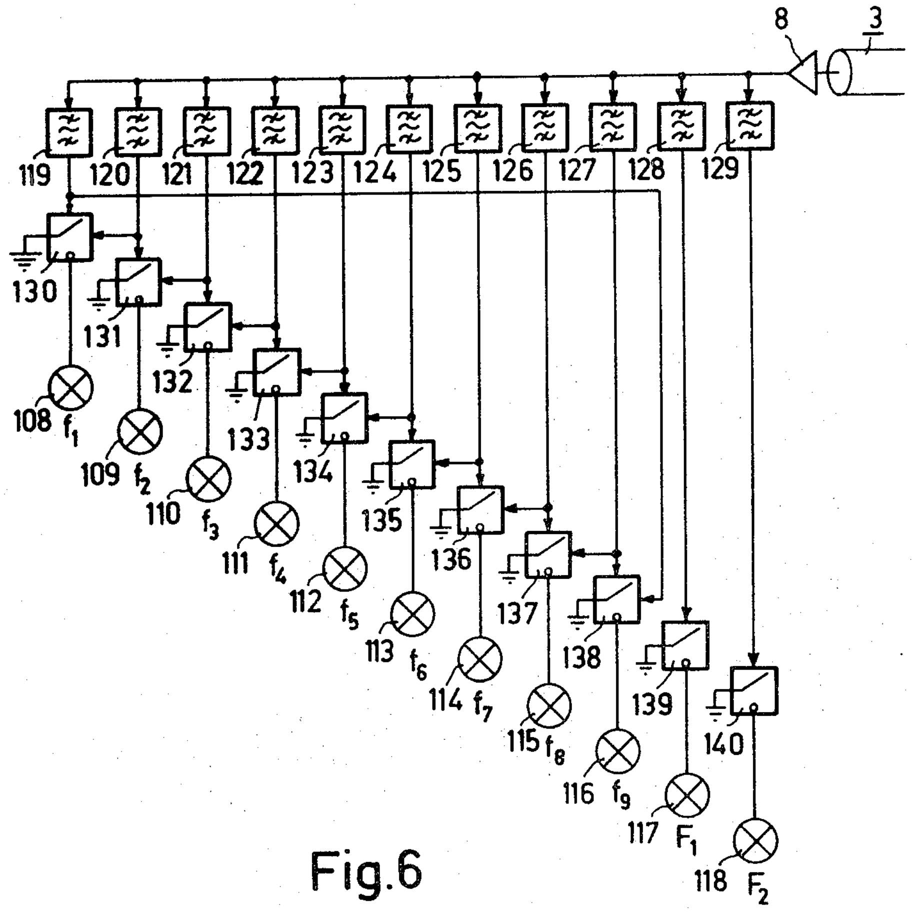
FIG. 6 is an embodiment of an indicator to be used in the transmission system according to FIG. 5.

A particularly favourable embodiment of an indicator 107 to be used in the transmission system described is diagrammatically shown in FIG. 6. The indicator shown in this Figure is adapted to indicate the reception of the frequencies $f_1, f_2, \ldots, f_9$ as well as the frequencies $F_1$ and $F_2$. The indication is effected by incandescent lamps 108 – 118 which light up and which are connected through selection filters 119 – 129, respectively, to the output circuit of the line amplifier 8, said filters being tuned to the frequencies $f_1, f_2, \ldots, f_9$, $F_1$, $F_2$, respectively. Switches 130 – 140 which cause the associated lamp to light up under the control of the output signal from the associated filter are included in the output circuit of the filters 119 – 129. For switching off a burning lamp these switches 130 – 138 are also controlled by the output signals from the filters 120 – 127, 119, respectively. The indication lamps 117 and 118 are only extinguished by switching off the measuring oscillator circuits tuned to the frequency $F_1$ and $F_2$, respectively, which unlike the other measuring oscillator circuits of the repeater stations associated with a group are not switched off by increasing the level of the control signal so that a continuous indication is obtained of the group whose composite line repeaters are checked.

Thus as indicator is obtained with which a relatively small number of indication means can be sufficient by using the separate groups of characterizing frequencies, while in addition at most one of the indication lamps 108 – 116 always lights up to indicate the measuring frequency $f_1, \ldots, f_9$.

What is claimed is:

1. A transmission system for information signals within a prescribed frequency band, comprising a transmission line for transmitting said information signals in either direction and for supplying the direct current for said system, a plurality of repeater stations coupled to said transmission line, each of said repeater stations comprising an amplifier coupled in series with said transmission line, and a bypass circuit for said direct current coupled in parallel with said amplifier, said bypass circuit comprising a first filter means for coupling said bypass circuit to said transmission line, a measuring oscillator and a first switching device coupled in series to said measuring oscillator and coupled to said amplifier, said first switching device comprising a frequency selective circuit and an amplitude measuring device coupled in series to said frequency selective circuit, and a terminal station coupled to each end of said transmission line, said terminal station comprising a direct current supply means coupled to said transmission line, a second filter means coupled to said transmission line, control device means coupled to said transmission line through said filter means for controlling the switching devices in said repeater stations, said control device means comprising a control oscillator circuit and an adjustable amplitude control circuit connected to said control oscillator circuit for producing signals characterized by preset frequency and amplitude, the frequency of said control device being lower than said prescribed frequency band and transmitted to said switching device through said transmission line and said bypass circuit thereby activating said measuring oscillator when the amplitude of the control signal being applied through said frequency selective circuit to said amplitude measuring device corresponds to the present amplitude value of said amplitude measuring device.

2. A transmission system as claimed in claim 1 wherein said control oscillator comprises a plurality of generators and said adjustable amplitude control circuit further comprises a plurality of attenuation networks arranged in cascade, said cascade arrangement connected in parallel to said amplitude control circuit.

3. A transmission system as claimed in claim 2 wherein the preset amplitude value of said amplitude measuring device is equal for all of said plurality of repeater stations, the values of successive attenuation networks in series arrangement of the amplitude control circuit corresponding to the attenuation of the successive repeater stations.

4. A transmission system as claimed in claim 1 wherein the frequency selective circuits of an equal number of successive repeater stations are tuned to mutually unequal frequencies.

5. A transmission system as claimed in claim 4 wherein the frequency selection circuit in said switching device in said repeater station comprises a plurality of parallel arranged capacitors coupled to said frequency selective circuit.

6. A transmission system as claimed in claim 1 wherein the frequencies of said control signals are within the frequency band from 2 to 35 KHz.

7. A transmission system as claimed in claim 1 wherein said filter means coupled to said transmission line comprises a bypass loop for the direct current.

8. A transmission system as claimed in claim 1 wherein said plurality of repeater stations are arranged in groups of successive repeater stations, the measuring oscillators of each of said groups being tuned to mutually unequal frequencies, the control device comprising a control oscillator having a fixed frequency.

9. A transmission system as claimed in claim 8 wherein a measuring oscillator of one of said repeater stations within each group is tuned to a tuning frequency characterizing the relevant group and distinguishing from others of said groups.

10. A transmission system for the transmission of information signals in a prescribed frequency band between two terminal stations through a transmission line including repeater stations in which the line amplifiers included in each repeater station for direct current supply are shunted by a direct current supply bypass circuit conveying the direct current supply and being connected through separating filters to the transmission line, said direct current supply and the information signals being transmitted through the transmission line, said repeater stations each being furthermore provided with a cascade arrangement of a measuring oscillator circuit and an oscillator start-stop device, said cascade arrangement being connected to the input of the line amplifier, said device being controlled through the transmission line and without the use of a separate control lead by a control device incorporated in a terminal station, the measuring signal originating from the measuring oscillator circuit being indicated by an indicator incorporated in said terminal station, said control device comprising a control oscillator circuit having an adjustable amplitude control connected thereto for generating control signals characterized by their frequency and their amplitude for the purpose of controlling the oscillator start-stop devices in the different repeater stations, said control signal being transmitted at a control frequency below said frequency band through the transmission line and through the direct current supply bypass circuit to the oscillator start-stop devices in the different repeater stations while bypassing the line amplifiers, said control oscillator circuit having an adjustable amplitude control comprising a plurality of generators and an amplitude control coupled in a cascade arrangement to said plurality of generators, said amplitude control comprising an input terminal and a plurality of attenuation networks arranged in a cascade arrangement coupled in parallel to said input terminal, the values of the successive attenuation networks in the cascade arrangement of said amplitude control corresponding to the attenuation of the successive sections of the transmission line between two successive repeater stations, said oscillator start-stop device being provided with cascade arrangement of a frequency selective circuit and an amplitude measuring device activating each relevant measuring oscillator circuit connected thereto only when the amplitude of the control signal applied through the selective circuit to the amplitude measuring device correspond to the amplitude adjustment of the amplitude measuring device, the amplitude adjustment of said amplitude measuring devices in the receiver stations being equal for all repeater stations.

* * * * *

UNITED STATES PATENT AND TRADEMARK OFFICE

CERTIFICATE OF CORRECTION

PATENT NO. : 3,766,337

DATED : October 16, 1973

INVENTOR(S) : JASPER HENDRIK DUIMELAAR

It is certified that error appears in the above-identified patent and that said Letters Patent are hereby corrected as shown below:

On the Title page, Section [30] change "7105347"

to --7116767--.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*